Oct. 9, 1928.
1,686,787
A. M. BATES
MACHINE FOR MAKING AND FILLING BAGS
Filed Dec. 6, 1919     9 Sheets-Sheet 5
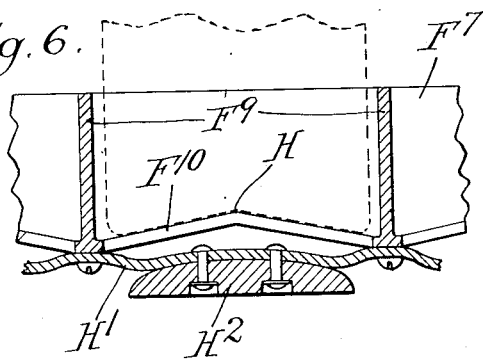
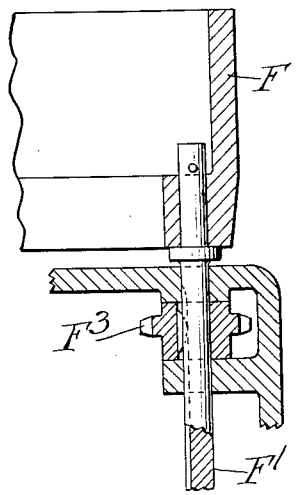
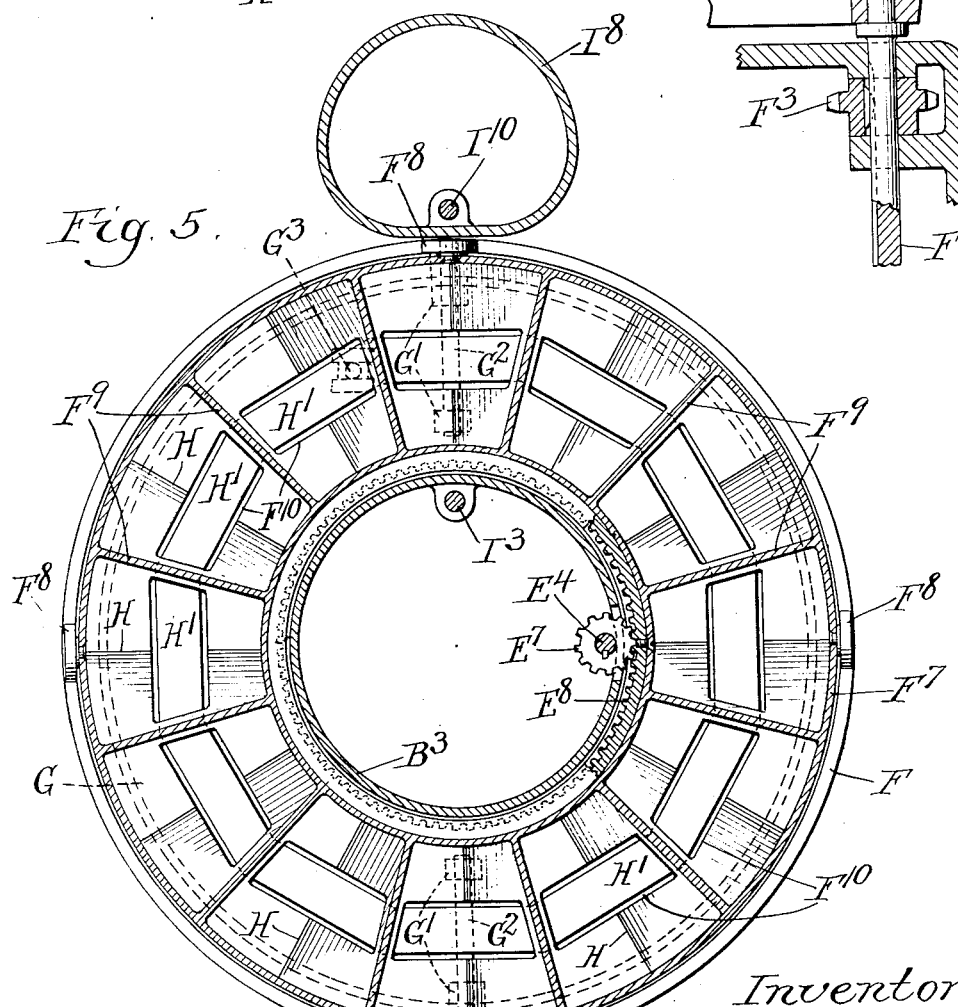
Witness.
Edward T. Wray.
Inventor.
Adelmer M. Bates.
by Parker & Carter
Attorneys.

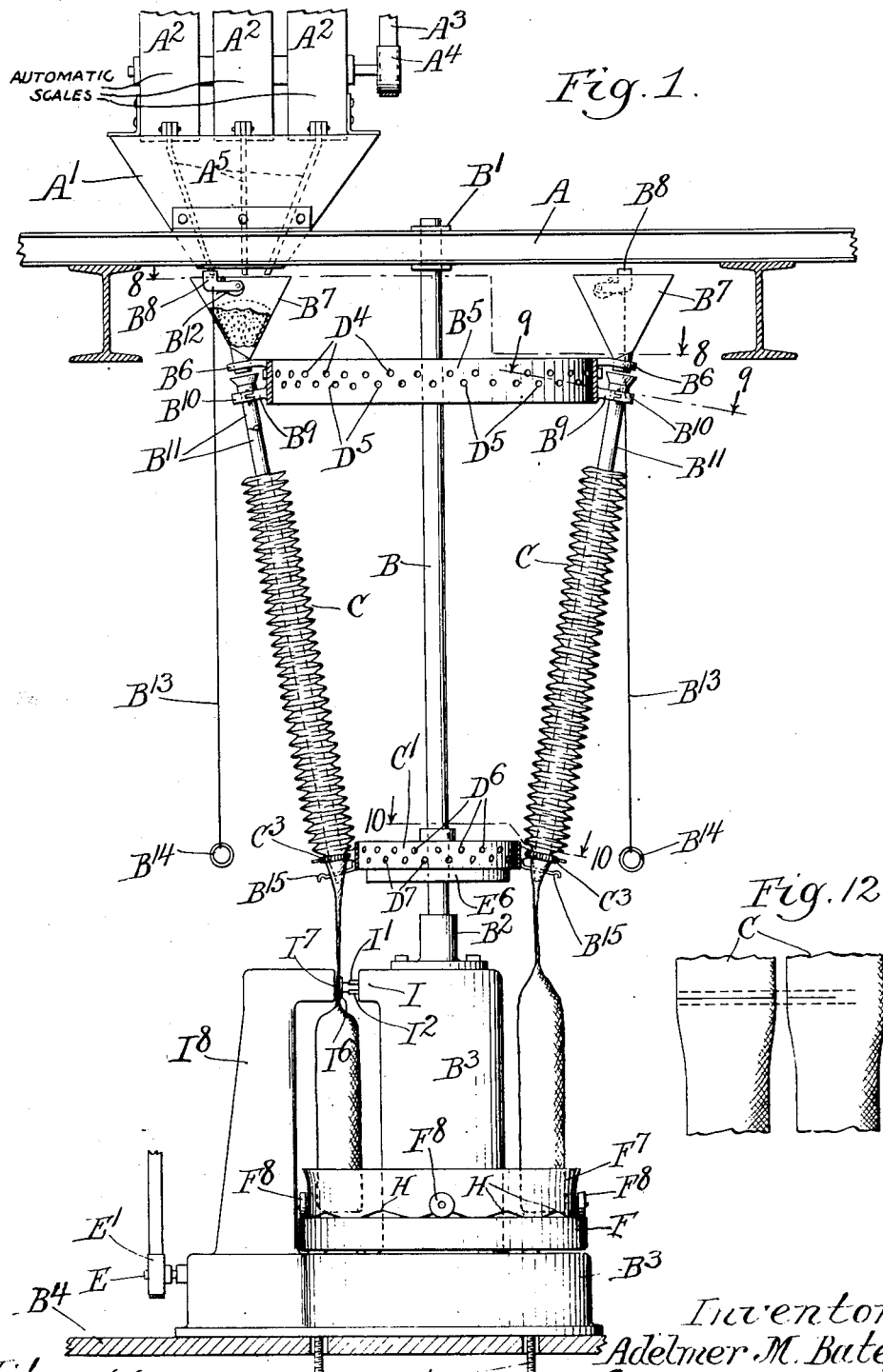

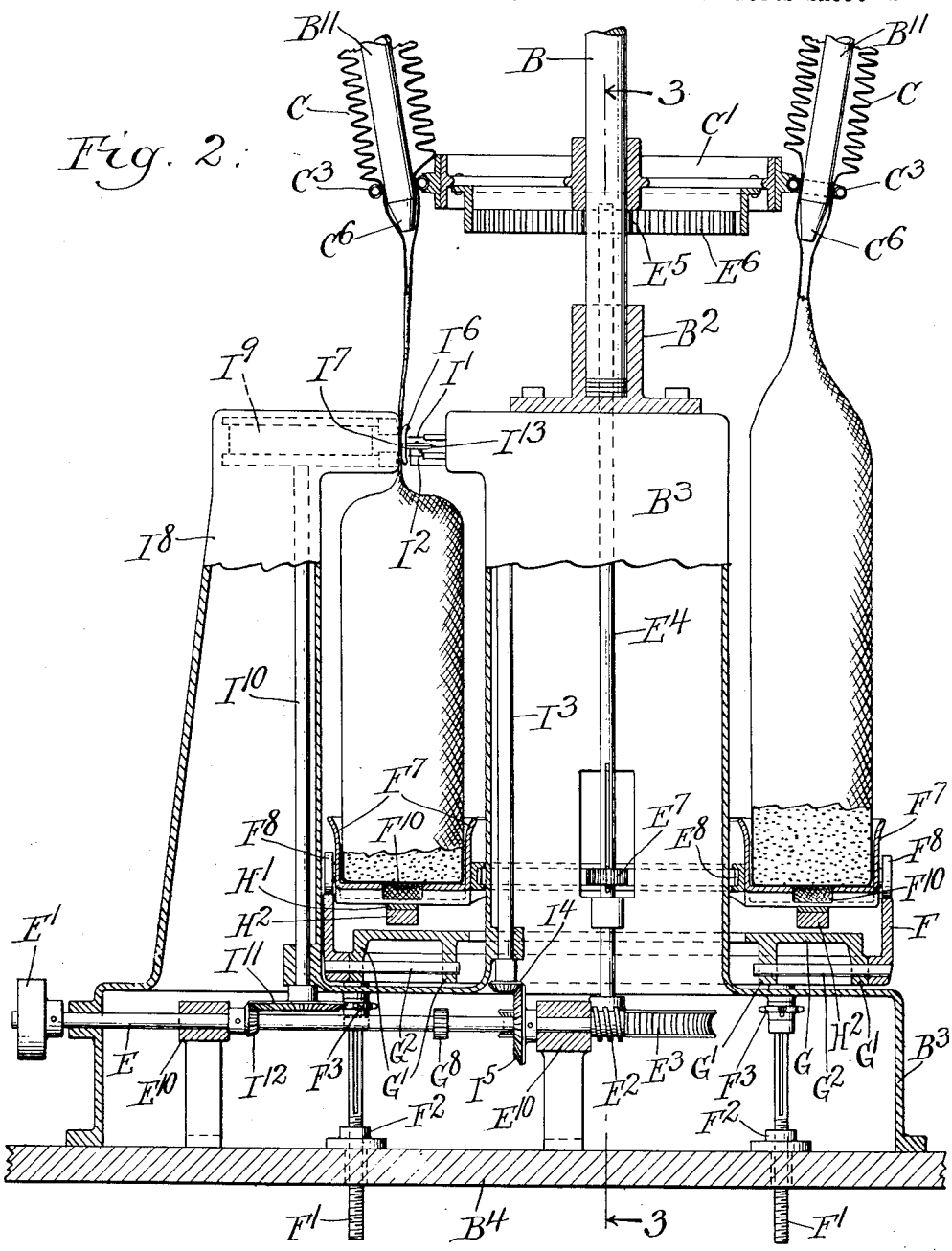

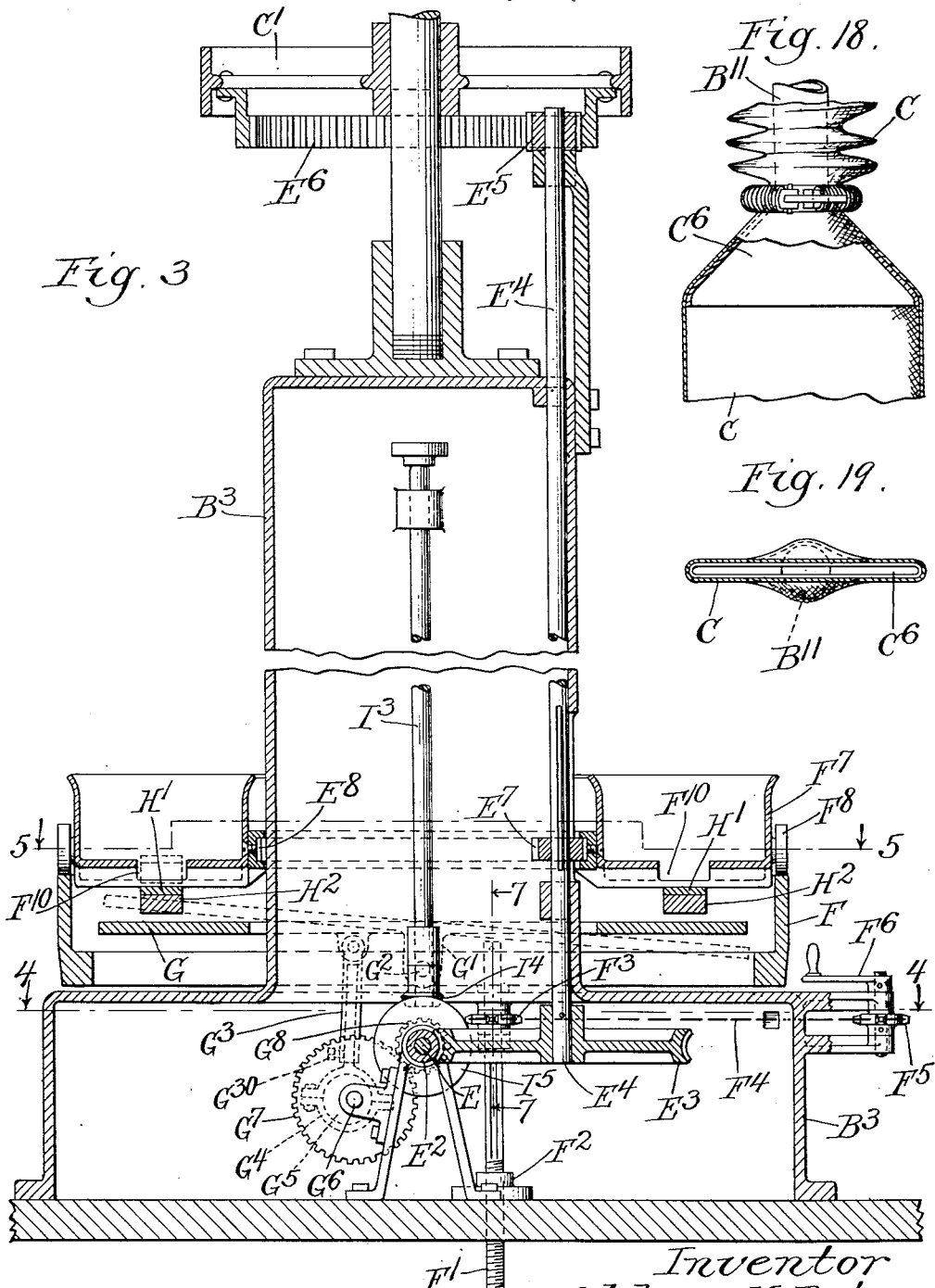

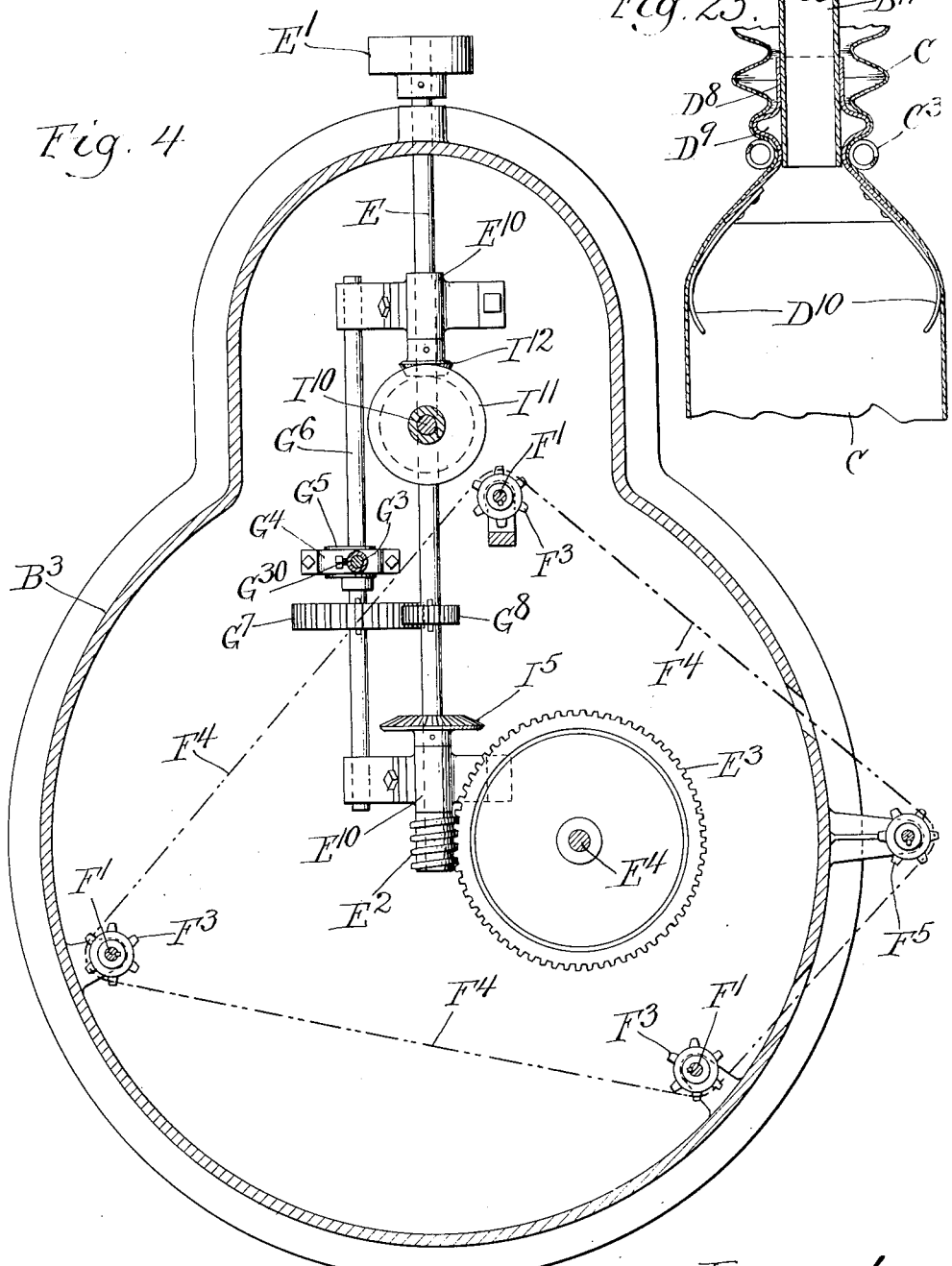

Oct. 9, 1928.
A. M. BATES
1,686,787
MACHINE FOR MAKING AND FILLING BAGS
Filed Dec. 6, 1919   9 Sheets-Sheet 6
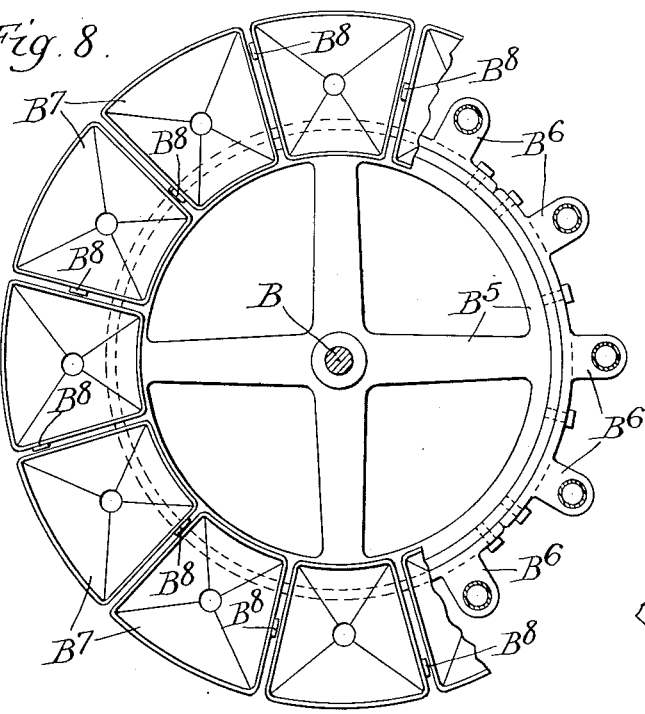
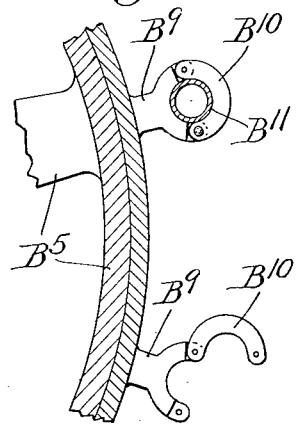
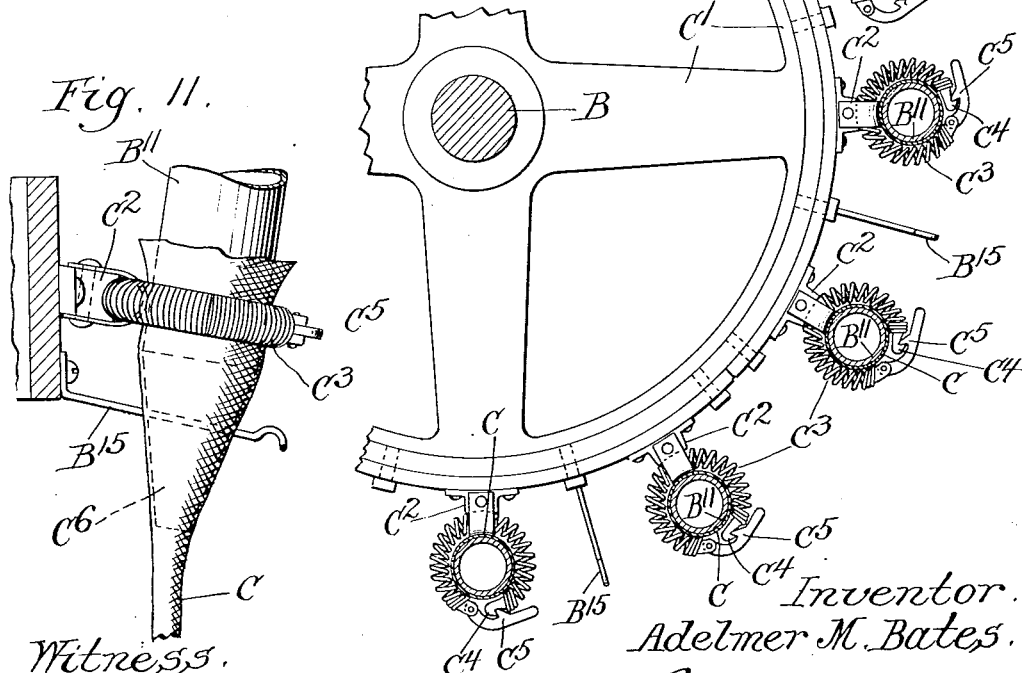

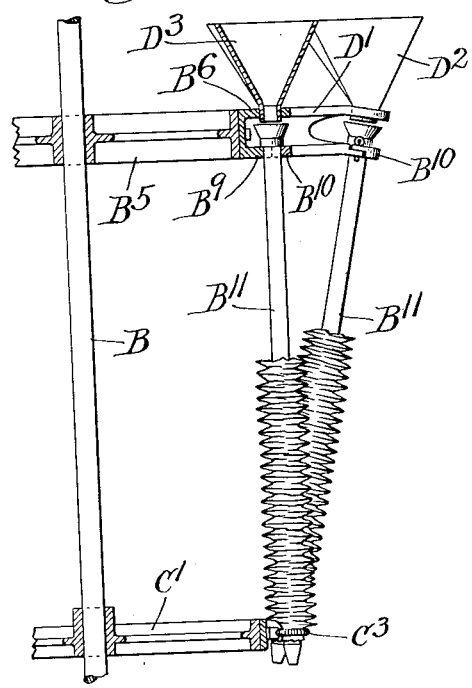
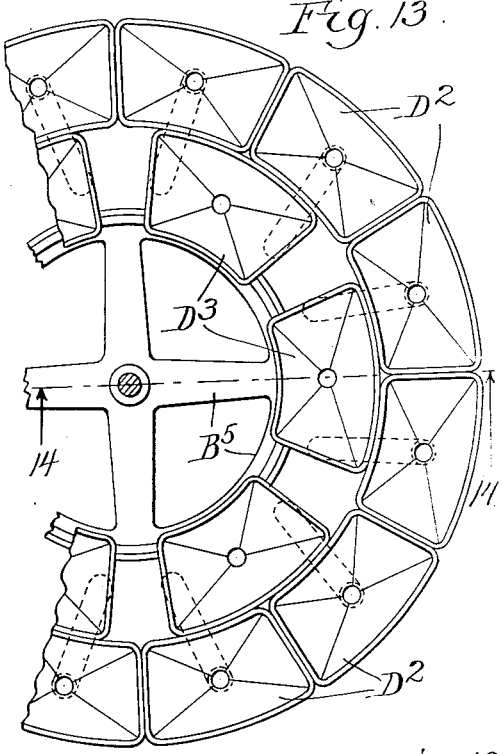
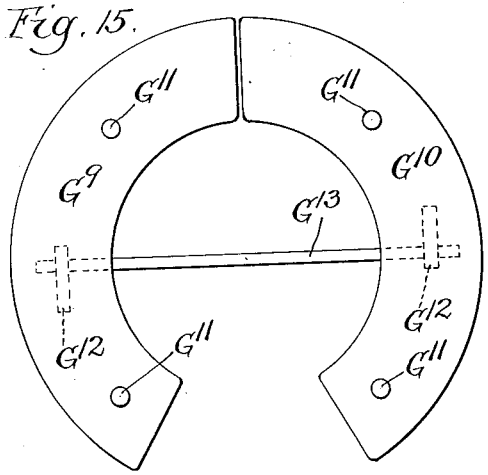
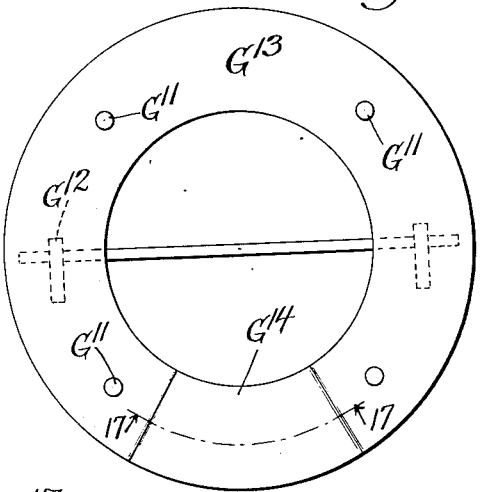

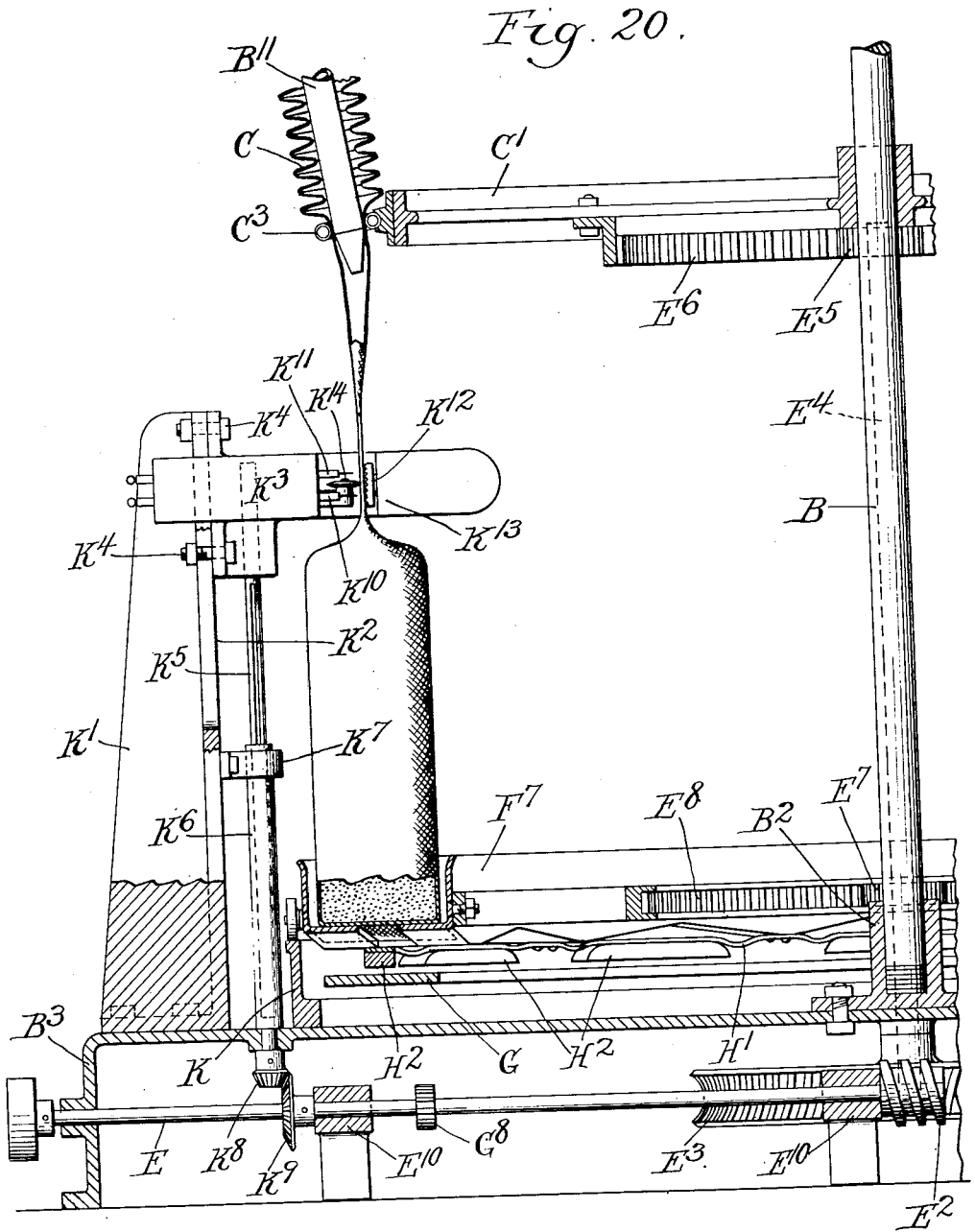

Oct. 9, 1928. 1,686,787
A. M. BATES
MACHINE FOR MAKING AND FILLING BAGS
Filed Dec. 6, 1919 9 Sheets-Sheet 9

Witness.
Edward F. Wray.

Inventor.
Adelmer M. Bates,
by Parker & Carter
Attorneys.

Patented Oct. 9, 1928.

1,686,787

UNITED STATES PATENT OFFICE.

ADELMER M. BATES, OF CHICAGO, ILLINOIS, ASSIGNOR, BY MESNE ASSIGNMENTS, TO BATES VALVE BAG CORPORATION, OF CHICAGO, ILLINOIS, A CORPORATION OF DELAWARE.

MACHINE FOR MAKING AND FILLING BAGS.

Application filed December 6, 1919. Serial No. 343,073.

My invention relates to improvements in machines and processes for making and filling bags. It has for one object to provide a process whereby a series of bag tubes may be successively stored on storage tubes may be successively drawn off, filled with material, and transversely sewed to form bags in an expeditious and economical manner. Another object is to provide a machine for carrying out the process. Another object is to provide new and improved means for sewing across a series of tubes successively to form a continuous series of separate filled bags. Other objects will appear from time to time in the specification.

My invention is illustrated more or less diagrammatically in the accompanying drawings, wherein—

Figure 1 is a diagrammatic side elevation of the whole apparatus with parts in section and parts removed;

Figure 2 is a cross-section on an enlarged scale of the lower part of Figure 1, showing the bag-supporting and jigging means;

Figure 3 is a section along the line 3—3 of Figure 2 showing especially the sewing machine and jigging table drive;

Figure 4 is a section along the line 4—4 of Figure 3, showing the driving mechanism and especially the means for adjusting the height of the table;

Figure 5 is a section along the line 5—5 of Figure 3;

Figure 6 is a section on an enlarged scale through one of the bag-supporting and jigging blocks;

Figure 7 is an enlarged detail section along the line 7—7 of Figure 3, showing one of the screws for raising and lowering the jigging platform;

Figure 8 is a plan view of the feed hopper assembly in part section along the line 8—8 of Figure 1;

Figure 9 is a section along the line 9—9 of Figure 1, showing the upper attachment for the storage tubes;

Figure 10 is a section along the line 10—10 of Figure 1, showing the lower attachment for the storage tube and the tube constricting girdle;

Figure 11 is a detail side elevation of the lower spring clamp or girdle;

Figure 12 is a side elevation of two sewed bags, showing the stitching;

Figure 13 is a plan of a modified arrangement of feed hoppers;

Figure 14 is a section along the line 14—14 of Figure 13, showing the modified arrangement of storage tubes when staggered groups of hoppers are used;

Figure 15 is a plan view of the preferred form of jigging plate;

Figure 16 is a plan view of a modified form of jigging plate;

Figure 17 is a section along the line 17—17 of Figure 16;

Figure 18 is a detail elevation of the end of a storage tube showing the spreader;

Figure 19 is an end view of the tube shown in Figure 18, showing bag spread by the spreader;

Figure 20 is a section through a modified form of machine with parts omitted, showing a sewing machine adapted to be adjustable in height to change the length of the bag, with the jigging platform in permanent adjustment;

Figure 23 is a section through the end of a modified form of storage tube, showing the bag spread by spreader fingers.

Figure 22:
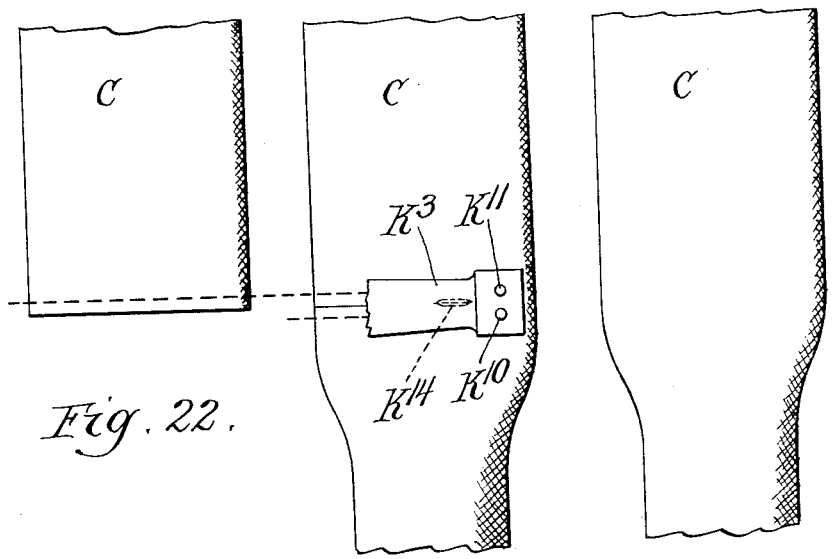
Figure 22 is a side elevation of some of the parts shown in Figure 21 with all except the head of the sewing machine omitted.

A is an upper supporting floor upon which is supported a feed hopper $A^1$ associated with a plurality of adjustable automatic scales or weighing machines $A^2$ supplied with material to be bagged from any suitable source, not here shown, and operated by power applied to a belt $A^3$ and pulley $A^4$. This hopper $A^1$ is fixed in place and has a wide open lower discharge mouth. $A^5$ $A^5$ are scale trip members extending down beneath the floor A, in the present case shown projecting out through the open mouth of the hopper $A^1$ though they might be otherwise disposed. These trip members are each adapted when operated to throw their respective scales into operation to cause such scales to discharge a measured weight of material into the hopper $A^1$.

B is a central supporting shaft journaled at its upper end at $B^1$, supported by the floor A, and at its lower end in the sleeve $B^2$ on the main machine frame or housing $B^3$, which housing in turn rests upon the lower floor $B^4$. $B^5$ is a hopper wheel mounted on the shaft B and provided about its periphery with a series of outwardly projecting lugs $B^6$, which carry the individual charge-receiving hoppers $B^7$, which hoppers are adapted successively to pass beneath the discharge mouth of the hopper $A^1$. These hoppers are packed closely together about the periphery of the ring $B^5$ and each one of them carries upwardly projecting from its lip an adjustable stop $B^8$, which is normally thrown up so as to engage one of the trip members $A^5$ as the hopper passes into register with the funnel $A^1$. It will be noted that the adjustable stops $B^8$ are differently positioned on the hoppers so that, as the bag hoppers pass around, successive weighing machines are caused to successively discharge their weighed charges, of material into the hopper $A^1$, whence, the charges immediately pass into the successive hoppers $B^7$. It will be noted that the adjustable stops $B^8$ are normally held in the upright position, but since they are pivotally mounted they may be dropped down if desired so that any individual hopper may pass beneath the main discharge hopper without receiving a charge of material. $B^9$ $B^9$ are a series of brackets projecting outwardly from the periphery of the wheel $B^5$ immediately beneath the lugs $B^6$. These brackets have curved storage tube engaging surfaces as indicated, and have pivoted on their outer extremities semi-circular tube clamps $B^{10}$, which may be held by pins or other suitable means in the closed locking position to hold the storage tube $B^{11}$ in register with the discharge end of the funnel $B^7$. The adjustable stops $B^8$, which are held up by the springs $B^{12}$, may be held out of operation by means of the pull cords $B^{13}$ and rings $B^{14}$, which may be hooked into the hooks $B^{15}$ on a wheel $C^1$, so that if all the tubing on any one of the storage tubes is paid out that tube may be thrown out of operation and remain out of operation until a new storage tube can be supplied, when the operator releases the latch and the operation of that tube will go on as before.

These storage tubes $B^{11}$ come to the machine each of them with a long length of bag tubing C puckered thereon. This tubing is formed and threaded on the storage tube by means or apparatus not here shown, but there would normally be many hundreds of feet of tubing on each storage tube when that tube is placed in the machine. The upper end of the tube is detachably fastened in position as above indicated, and the lower end is held in position by the wheel $C^1$ on the shaft B by means of a lug $C^2$ projecting outwardly from that wheel and carrying a spiral spring girdle $C^3$ passing through the lug $C^2$ and having at one end a hook $C^4$ and at the other a latch $C^5$, whereby the girdle may be stretched around the lower end of the storage tube and hold that tube in position, at the same time exerting a yielding, clamping effect on the tubing as it is drawn off the storage tube, the result of this being that the tubing must be puckered laterally or constricted as it is drawn off the storage tube, and thus there is an appreciable, though yielding, resistance to the downward movement of the tubing from the storage tube. The tubing as it is drawn off the storage tube is spread apart by the flat, funnel-shaped extension $C^6$ on the end of the storage tube. This extension, which is preferably integral with the tube, is very narrow in proportion to its length, and tends to flatten the tubing as it comes off, so as to get it ready for sewing, but also effectively prevents the tubing from dropping off the storage tube, even if the spring girdle be dispensed with. In Figure 19 an end view shows the shape of the tubing as it is drawn off this flattened, funnel-like extension.

Attention is here called to a slight modification shown in Figures 13 and 14, wherein an increased number of storage tubes is provided for. It will be noted that the lugs $B^6$ and $B^9$ are mounted in pairs on the wheel $B^5$. If it is desired, supporting members $D^1$ may be added, so that we may have two or more rows of hoppers, as shown at $D^2$ $D^3$ in Figure 13. In this case the storage tubes will be held in position in exactly the same manner as before, but there will be an increased number of these tubes and they will be spaced more closely together about the lower wheel $C^1$ so that narrower bags can be filled. Attention is called to the series of differently spaced bolt holes $D^4$ $D^5$ $D^6$ $D^7$ on the peripheries of the wheels $B^5$ and $C^1$, whereby these different hopper and storage tube supports may be held in place. By this means the tubes may be adjusted laterally to compensate for different diameters of bags that are to be filled, more tubes being inserted and being placed more closely together where the bags are to be of small diameter. Attention is also called to the modification shown in Figure 23, where there is a sleeve $D^8$ slipped over the end of the storage tube $B^{11}$, which sleeve has an integral ring $D^9$ overlying the spring girdle $C^3$, so as to add to the resistance of the tubing as it passes down. Associated with this sleeve $D^8$ is a yielding spreader member $D^{10}$, which tends to spread the tubing apart in the same manner as above indicated.

The supporting frame and housing $B^3$ contains a main drive shaft E, driven by any suitable source of power applied to the pulley $E^1$ and suitably journaled as indicated in the bearings $E^{10}$ $E^{10}$ on brackets projecting upwardly from the supporting floor. This main shaft at its inner end carries a worm $E^2$ in mesh with a worm gear $E^3$. This worm gear is keyed to a vertical driving shaft $E^4$, which extends up through the housing $B^3$ and carries at its upper end a pinion $E^5$ in mesh with an internal gear $E^6$ on the wheel $C^1$, so as to cause a gradual rotation of all of the individual bag-filling hoppers and the group of storage tubes. The continuous movement which is thus imparted to the hoppers and storage tubes does not interfere with the feed of material because a charge of material is dropped from the hopper $A^1$ immediately into the hopper $B^7$, without spilling, at the instant that the two are in register, and the material has ample time to gradually run out of the hopper $B^7$ while the apparatus is rotating. $E^7$ is a pinion splined for longitudinal movement along and held against rotation with respect to the shaft $E^4$, and this pinion is in mesh with an internal gear $E^8$ on the inside of the bag support. The relations between the pinion $E^7$ and gear $E^8$ and the pinion $E^5$ and gear $E^6$, are such that the bag support rotates at the same angular velocity as the storage tube assembly.

F is an annular supporting ring surrounding the central portion of the frame and housing $B^3$. It rests on the three elevating screws $F^1$ $F^1$. These screws are screw-threaded in fixed nuts $F^2$ $F^2$ in the floor $B^4$ and have splined thereon the spockets $F^3$, fixed in position inside the housing. These sprockets $F^3$ are adapted to be rotated in unison by sprocket chain $F^4$ driven by a driving sprocket $F^5$ and crank $F^6$, the arrangement being such that when the operator rotates the crank the screws are rotated in the nuts by the sprockets and raise or lower the annular ring F to raise and lower the bag supporting and jigging mechanism mounted thereon, and thus provide for varying the length of the bags. $F^7$ is an annular bag supporting trough or frame. It is provided with rollers $F^8$ traveling along the upper edge of the annular ring F and carrying on its inner side the internal gear $E^8$ above referred to. This trough or bag-supporting member is divided by the radial walls $F^9$ into a plurality of bag-supporting compartments, though of course these walls might be dispensed with and bags be held in position by other means, and each off these compartments has a centrally disposed aperture $F^{10}$ in its bottom. The bag rests on the bottom floor of this compartment and the bag is jigged by jigging means operating upon it through this aperture.

The jigging means takes the form of a plate G having downwardly projecting lugs $G^1$ and pivoted on pins $G^2$ in the ring F. This plate is rocked by means of an eccentric rod $G^3$ terminating in an eccentric strap $G^4$ on the eccentric $G^5$. This eccentric is mounted on a shaft $G^6$ and driven by means of a gear $G^7$ and pinion $G^8$ from the main drive shaft E, so that this flat annular plate constantly rocks beneath the bag support as the bag-supporting channel rotates above it. The eccentric rod $G^3$ is adjustable as to length to allow for the adjustment of the bag supporting and jigging tables and is held by the set screw $G^{30}$. In the modified form shown in Figure 15 the two segmental jigging plates $G^9$ $G^{10}$, and in the modified form shown in Fig. 16 the jigging plate $G^{15}$, move vertically, being guided by the upright pins $G^{11}$ $G^{11}$ and being driven by eccentrics or cams $G^{12}$ on an eccentric or cam shaft $G^{13}$. By setting the cams $G^{12}$ on opposite sides of the cam shaft in Fig. 15, the plates move up and down alternately to check vibration. It will be noted that there is a dead space where there is no jigging plate, because, for reasons which will subsequently appear, it is necessary at one point in the travel of the bag that the bag should not be jigged. In the modified form shown in Figures 16 and 17 one plate $G^{15}$ is used, substituted for the two segments $G^9$ $G^{10}$, and in this case the plate is depressed as at $G^{14}$ to provide a dead point where the bag will not be jigged.

Referring now to Figure 6, attention is called to the fact that the bottom wall of each bag pocket is higher at the center than at the ends, as shown at H, the purpose of this being to tend to deflect material in the bag down to the corners of the bag, thus filling the corners and providing a properly filled bag. $H^1$ is a flexible strip which may or may not extend throughout the entire periphery of the bag-supporting device. This flexible strip is rigidly mounted on the bag-supporting member and moves with it as it rotates, and it carries a plurality of resilient rubber, leather, or even wood blocks $H^2$, adapted to rest upon the jigging plates G or $G^9$, $G^{10}$, $G^{15}$, and adapted as these jigging plates move up and down to be repeatedly thrust by such movements upwardly into each bag pocket through the aperture in the floor thereof to jig the bags and cause the material to settle therein. The flexible strip or belt is, of course, narrow enough so that it can enter with the block into the bag pocket and it serves the double purpose of keeping the blocks in proper position and causing them to move with the bag-supporting apparatus and, when the modified forms shown in Figures 15 and 16 are used, preventing the blocks from dropping out and getting lost when the dead point in the jigging mechanism is being passed.

Projecting outwardly from the housing and frame $B^3$ is a sewing machine head I, having the two separate needles $I^1$ $I^2$. This sewing machine is operated by a shaft $I^3$ which, in turn, is driven by a mitre pinion $I^4$ from the mitre gear $I^5$ on the shaft E. $I^6$ is a presser foot tending to press the fabric of the bag over against the platen I⁷, mounted on the bracket I⁸, which projects up from the frame B³. The driving wheel I⁹ in this platen is driven by the shaft I¹⁰, mitre gear I¹¹ and mitre pinion I¹² from the shaft E, and the arrangement of the apparatus is such that as the operator pulls down the tubing and allows it to be filled the sewing machine makes two continuous, parallel rows of stitches through the walls of successive bags, the space between the bags being such that there is just a short distance between adjacent bags during which the stitching continues, as shown in Figure 12, so that when the stitching between the bags is cut there is sufficient material on either side to prevent raveling of the seam.

Associated with the presser foot and platen is a cutting knife I¹³, which automatically severs the fabric between the two rows of stitches, so that when the stitching is finished the bag has been separated from the bag tube.

Figure 21:
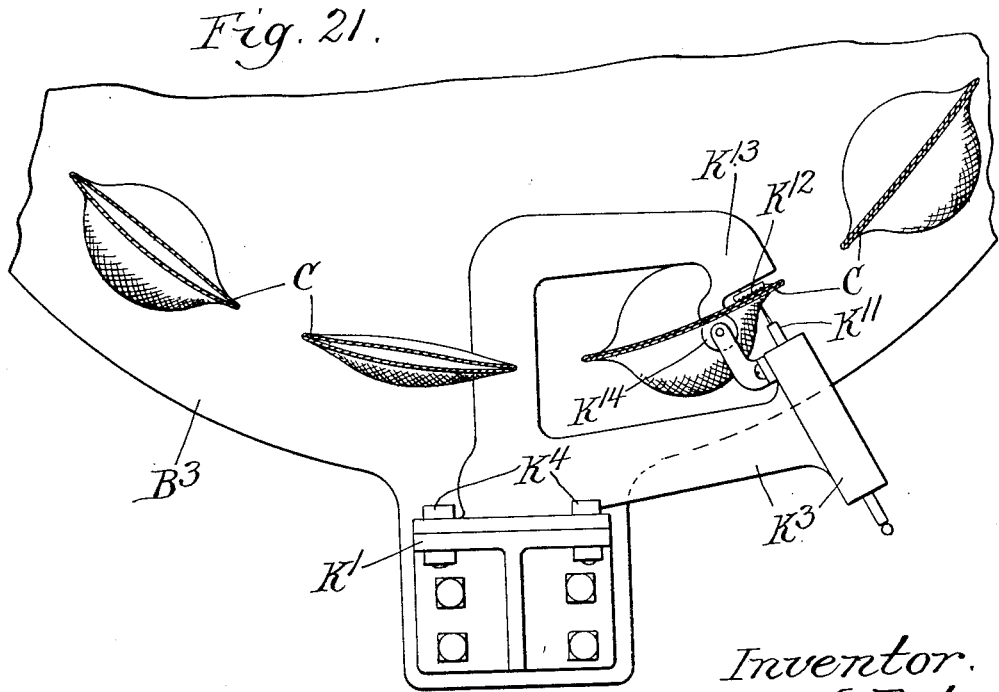
Figure 21 is a plan view of the arrangement shown in Figure 20 with bag supporting and jigging means omitted.

In Figures 20, 21 and 22 is shown a slightly modified form. The modification consists in this, that instead of moving the whole jigging apparatus and bag-supporting mechanism upwardly toward the sewing machine and toward the ends of the storage tubes when a short bag is to be filled, means are provided for adjusting the position of the sewing machine head toward and from a bag support which is not vertically adjustable. In this case it will be noted that there is an annular ring K resting on the main frame and it supports the bag-carrying mechanism and incloses the jigging mechanism. K¹ is a sewing machine bracket projecting up from the main frame. It has a vertical, slotted supporting surface K² and the head of the machine K³ is mounted for movement along that surface, being adapted to be held in position thereon by the bolts K⁴ K⁴. K⁵ is a splined solid shaft mounted for longitudinal movement in the hollow shaft K⁶, which hollow shaft is guided at its upper end by a bearing K⁷ on the bracket K¹ and at its lower end is driven by the pinion K⁸ and gear K⁹ from the shaft E, thus permitting a telescopic relation between the shafts K⁵ and K⁶ while taking the drive through them, no matter what their longitudinal arrangement. The shaft K⁵ drives the two needle bars K¹⁰ K¹¹ to make the two parallel stitches. It also drives the feeder K¹² on the platen K¹³, so that the entire sewing machine as a unit is mounted on the bracket K¹ and may be moved adjustably in a vertical direction to provide for varying lengths of bags. K¹⁴ is the cutting knife adapted to sever the bag tubing between the rows of stitches as before.

I have shown a more or less complicated machine. Its complication largely arises, however, from the fact that a number of co-operating parts are brought together to carry on a continuous process whereby bags are filled, sewed up and severed from a stored length of bag tubing by an automatic arrangement, and clearly, while I have shown a preferred arrangement and structure, there might be many changes—and I have shown a few of them—in many of the different parts co-operating to make up my machine, and I wish, therefore, that my drawings be regarded as in a sense diagrammatic.

It will be noted that at the place where the sewing is done the bag is not jigged, because in one form the axis of rotation of the jigging plate passes through that point and in the other forms the jigging plate is cut away or depressed, as shown in Fig. 15, or depressed, as shown at G¹⁴ in Figs. 16 and 17. The reason for this is that it would not do to jig the bag while sewing it, but it is desirable to jig it elsewhere during its passage. A good result is given by an increase of the jigging movement while the material is being fed into the bag, and such an increase in jigging movement is given by the rocking jigging plate.

The use and operation of my invention are as follows:—

Assuming that the tubing from which the bags are to be made has been made in any desired manner and from any suitable material, it will have been threaded upon the feed tube so that a very great length of bag tubing will have been received upon the exterior of the feed tube. The tubing is held in position on the feed tube in any desired manner, as for example by means of an enlarged end whose cross section is approximately the normal cross section of the bag tube, or by an inside tube spreader, elastic or otherwise, or by an exterior clamp, elastic or otherwise, which would surround both the tubing and the feed tube. Any or all of these or any similar devices may be used jointly or separately, and, is desired, may be arranged so as to be removably mounted on or associated with the lower ends of the feed tubes. In the preferred form the lower or discharge end of the feed tube is very much larger in cross section than the body of the tube. The upper end of the tube may be of the same cross section as the tube body or a little larger for convenience in receiving the charge or, under certain conditions, it may have a charge receiver mounted upon it, and integral with it. In the preferred form the charge receiver is separately mounted but in register with the feed tube and the enlargement at the upper end of the tube is smaller than the spreader. Thus it will be seen that the arrangement is such that the tubes can be conveniently supplied with tubing by threading it on over the upper or smaller end of the feed tube and the tubing will be held in position by the lower enlargement on the feed tube.

The feed tubes with the tubing threaded thereon are attached to the supporting wheels so as to bring the bottom ends of the tubing, when spread, into the relation shown in Figs. 12 and 22, the proper holes $D^4$, $D^5$, $D^6$ and $D^7$ being selected for the purpose. When the bags are in this relation the sewing machine can be run continuously without undue waste while the tube support is rotating. It will be noted that the individual charge receiver $B^7$ associated with each tube is materially further across the top than the distance across the bag tubing when spread, so that it is necessary that the lower ends of the feed tubes be nearer together in their path of travel than are the upper ends, in order to bring the filled bags in proper position for closing and severing. Ordinarily the slanting arrangement shown in Fig. 1 is sufficient for achieving this result, but where smaller bag tubes are to be filled it may be necessary at times to use the mounting shown in Figs. 13 and 14, whereby the upper ends of the feed tubes are staggered. The one stationary discharge hopper $A'$ is sufficient to feed all the tubes, as it can discharge very quickly into the large mouthed hoppers $B^7$.

As the successive weighings might not take place quickly enough with one weighing machine, it is convenient to have a series of such weighing machines, as shown. With such a series and with individual trippers which selectively trip the different scales, it is also possible to adjust the different scales for different charges and to mount tubes of appropriate diameters on the feed tubes into which the respective scales will discharge.

The feed tubes are ordinarily much smaller than the distended bag tubing, as a great length of bag tubing is ordinarily threaded upon a comparatively short length of feed tube, there being in practice enough bag tubing threaded on one feed tube to make about 400 bags. The bag tubing is, therefore, several times as large in cross section as the feed tube. For this reason it may require an appreciable time for the material to feed down through the feed tube to the bottom of the tubing, and this time is afforded while the tubes are moving from charge receiving to sewing positions, and during this time, the jigging device assists in packing the material into the end of the tubing.

The process of depositing or positioning the charge in feeding relation to the tube with the charge having a cross section materially greater than the cross section of the feeding tube is capable of being carried out by various mechanisms; and independently of the particular mechanism used it will achieve its object of allowing the deposition of the charge to be accomplished more quickly than it could be fed through the comparatively small feed tube. This advantage is best realized when the positioning of the charge is done at a fixed point and the feeding is continued during the movement of the feed tube and bag; and the jigging of the bottom end of the feed tube during this same movement aids in speeding up the process. Likewise, impeding the passage of the tube from the zone in which it is collapsed and the pulling of it from that zone as needed may be done by any suitable apparatus and is a feature which is found to be vital.

While the best results for an efficient and satisfactory machine are achieved by the use of the preferred forms herein shown and described, it is obvious that many of the separate features have utility which might be partially realized in other relations, and it is also obvious that the exact construction of the various features might be variously modified while still retaining many of the advantages above mentioned. I do not wish, therefore, to be confined by the structure shown beyond the terms of the appended claims.

In the appended claims the phrase "an elongated bag tube" is used to describe a tube long enough to make a plurality of bags.

I claim:

1. In a machine for making filled bags from a bag tube and filling material, the combination of a supporting frame, a feed tube adapted to carry an elongated bag tube, means for removably attaching the feed tube to the supporting frame, and a separately mounted charge-receiver adapted to receive the charge and deliver it to the feed tube.

2. In a machine for making filled bags from a bag tube and filling material, a supporting frame, a feed tube adapted to carry an elongated bag tube, means for removably attaching said feed tube to the frame while the bag tube is in position thereon and a charge-receiver adapted to receive the charge and deliver it to the feed tube.

3. In a machine for making filled bags from bag tubes and filling material, the combination of a series of feed tubes adapted each to carry a bag tube collapsed thereon, means for removably securing the feed tubes in position on a rotary frame, a bag-tube closing machine below and a charge supplying machine above the feed tubes, means for rotating the frame so as to bring the tubes successively in register with such charge supplying machine and such closing machine, and means whereby the rotation of the frame causes the charge supplying device to operate.

4. In a machine for making filled bags from bag tubes and filling material, the combination of a series of removably-mounted feed tubes each adapted to carry an elongated bag tube, a series of charge-delivering devices, means responsive to the movement of the feed tubes for operating said charge-delivering devices in succession as the tubes move past the same, a series of charge-receiving devices one for each tube and associated so as to travel therewith, and a guide which receives a charge from each charge-delivering device and guides it to a particular charge-receiving device.

5. In a machine for making filled bags from bag tubes and filling material, the combination of a series of removable feed tubes and means for holding them in position comprising an encircling clasp for the upper end of each tube and an encircling yielding clamp for the lower end of each tube.

6. The combination with a bag-forming tube, of a feed tube passing therethrough, a yielding girdle surrounding them both and adapted to clamp and constrict the bag tube about the feed tube, said girdle being made up of a spiral spring with a hook at one end and a latch at the other whereby the girdle may be clamped about the tube.

7. The combination with a bag forming tube, of a feed tube passing therethrough, a yielding girdle surrounding them both and adapted to clamp and constrict the bag tube about the feed tube, said girdle being made up of a spiral spring with a hook at one end and a latch at the other whereby the girdle may be clamped about the tube, and a support for said girdle comprising a loop surrounding it intermediate its ends and holding it in position while allowing it to expand and contract.

8. The combination with a bag forming tube, of a feed tube passing therethrough, a yielding girdle surrounding them both and adapted to clamp and constrict the bag tube about the feed tube, said girdle being permanently held intermediate its ends and having means whereby the ends may be joined together to lock the girdle in position.

9. In a bag filling machine, a pair of wheels spaced apart and mounted for rotation upon the same axis, bag tubes mounted between said wheels, and filling hoppers supported on the upper of said wheels in register with said tubes.

10. In a bag filling machine, a pair of wheels spaced apart and mounted for rotation upon the same axis, bag tubes mounted between said wheels, filling hoppers supported on the upper of said wheels in register with said tubes, a charge-supplying mechanism and means for manipulating it to discharge successive charges of material into said hoppers as they rotate.

11. In a bag filling machine, a horizontally disposed wheel and means for rotating it, a plurality of downwardly-discharging funnels spaced about the periphery of the wheel, a plurality of tubes detachably attached at their upper ends at the periphery of the wheel in register with the discharge ends of said funnels, and a lower wheel and means for detachably holding the lower ends of said tubes in place upon the periphery thereof.

12. In a bag filling machine, a horizontally disposed wheel and means for rotating it, a plurality of downwardly-discharging funnels spaced about the periphery of the wheel, a plurality of feed tubes detachably attached at their upper ends at the periphery of the wheel in register with the discharge ends of said funnels, a lower wheel and yielding means for detachably holding the lower ends of said tubes in place upon the periphery thereof, and a series of puckered bag tubes on said feed tubes and adapted to be constricted thereon by said yielding means and to have their movements longitudinally away from the tube yieldingly resisted thereby.

13. In a bag filling machine, a plurality of receiving hoppers arranged in a plurality of concentric substantially continuous rings, means for selectively supplying filling material to a plurality of storage tubes each of them in register with one of said hoppers, a bag forming tube threaded on each of said storage tubes, means for holding the tubes in position with their lower ends in a single circle, and means for drawing the bag tubes off the storage tubes and closing the ends thereof to form bags.

14. In a bag making and filling machine adapted to feed out a length of bag tubing, means for filling the bag, means for jigging the bag, and means for sewing the upper end of the length and separating it from the tube to form a bag, together with means, comprising a movable frame for adjustably positioning the bag supporting and jigging means with relation to the sewing and separating means to permit the making and filling of different sized bags, means for adjusting said frame vertically, a jigging plate rotatably mounted thereon and a bag support rotatably mounted thereon above the jigging plate.

15. In a machine for making filled bags from bag tubes and filling material, the combination of a feed tube adapted to have threaded thereon a longitudinally collapsed bag tube, with yielding means adapted to engage the inside of the bag tube and distend it as it is drawn from the feed tube.

16. In a machine for making filled bags from bag tubes and filling material, the combination of a feed tube adapted to have threaded thereon a longitudinally collapsed bag tube long enough to make a plurality of bags, with yielding means at one end of the feed tube over which the bag tube may be drawn and adapted to distend the bag tube and yieldingly resist the drawing of the bag tube from the feed tube.

17. In a machine for making filled bags from bag tubes and filling material, the combination of a feed tube adapted to have threaded thereon a longitudinally collapsed bag tube with an elastic girdle around the outside of the bag tube and one end of the feed tube, and a removable sleeve on the end of the feed tube having an annular enlargement adjacent the girdle.

18. The combination with a feeding tube of an elongated bag forming tube threaded thereon, a sleeve on the end of such tube and having an integral shoulder and a downwardly extending spreader member, and a yielding girdle surrounding such sleeve beneath the shoulder and adapted to yieldingly resist the longitudinal withdrawal of the tube around such shoulder.

19. In a machine for making filled bags from bag tubes and filling material, the combination of a feed tube adapted to have threaded thereon a longitudinally collapsed bag tube with an elastic girdle around the outside of the bag tube and one end of the feed tube, and a removable sleeve on the end of the feed tube having an annular enlargement just above the girdle and having yielding fingers on its lower end adapted to spread the bag tube as it is drawn thereover.

20. In a machine for making filled bags from bag tubes and filling material, a support, a feed tube adapted to have threaded thereon a longitudinally collapsed bag tube, means for attaching one end of the feed tube to the support at a point beyond where the bag tube extends, and means encircling the other end of the bag tube about the feed tube and attached to the support.

21. In a machine for making filled bags from bag tubes and filling material, a support, a feed tube attached at its upper end to the support and adapted to have threaded thereon a longitudinally collapsed bag tube, and an elastic girdle attached to the support and adapted to encircle the bag tube around the lower end of the feed tube.

22. In a machine for making filled bags from bag tubes and filling material, a support, a feed tube attached at its upper end to the support and adapted to have threaded thereon a longitudinally collapsed bag tube, a coil spring, a clip attaching the coil to the support adjacent the lower end of the feed tube, and a latch for uniting the ends of the coil to form an elastic girdle encircling the bag tube around the lower end of the feed tube.

23. In a machine for making filled bags from bag tubes and filling material, a support, a feed tube adapted to have threaded thereon a longitudinally collapsed bag tube, means for detachably securing the feed tube in approximately vertical position upon the support, said feed tube having an enlarged upper end, and a removable sleeve on the lower end of the feed tube, said sleeve carrying a spreader having a cross-sectional perimeter substantially equal to that of the bag tube.

24. In a machine for making filled bags from bag tubes and filling material, a support, a feed tube adapted to have threaded thereon a longitudinally collapsed bag tube, means for attaching one end of the feed tube to the support at a point beyond where the bag tube extends, means attached to the support and adapted to encircle the bag tube around the other end of the feed tube, and a sewing machine adapted to sew a seam across the bag tube beneath the feed tube.

25. In a machine for making filled bags from bag tubes and filling material, a support, a feed tube attached at its upper end to the support and adapted to have threaded thereon a longitudinally collapsed bag tube, an elastic girdle attached to the support and adapted to encircle the bag tube around the lower end of the feed tube, and a sewing machine adapted to sew a seam across the bag tube beneath the feed tube.

26. In a machine for making filled bags from bag tubes and filling material, a plurality of feed tubes each adapted to carry a longitudinally collapsed bag tube, a support, means for detachably fastening the feed tubes to the support in substantially vertical positions, means to move the support to carry the tubes in an endless path, a hopper attached to the support above and in registry with each feed tube, a sewing machine in the path of the bag tubes beneath the feed tubes, and means to actuate the sewing machine continuously during the movement of the support.

27. In a machine for making filled bags from bag tubes and filling material, a plurality of feed tubes each adapted to carry a longitudinally collapsed bag tube, a support, means for detachably fastening the feed tubes to the support in subtantially vertical positions, the upper ends of said feed tubes being more widely separated than their bottom ends, means to continuously move the support to carry the tubes in an endless path, a hopper attached to the support above and in registry with each feed tube, a sewing machine in the path of the bag tubes beneath the feed tubes, and means to actuate the sewing machine continuously.

28. In a machine for making filled bags from bag tubes and filling material, a plurality of feed tubes each adapted to carry a longitudinally collapsed bag tube, a support, means for detachably fastening the feed tubes to the support in substantially vertical positions, means to continuously move the support to carry the tubes in an endless path, a hopper attached to the support above and in registry with each feed tube, a stationary hopper beneath which the support carried hoppers pass in succession, a plurality of charge measuring devices discharging in succession into the same stationary hopper, a sewing machine in the path of the bag tubes beneath the feed tubes, and means to actuate the sewing machine continuously.

29. In a packaging device, a series of movable charge receivers, a stationary hopper beneath which the receivers are brought in succession, a series of stationary charge measurers adapted to discharge into the stationary hopper, and means carried by the movable receivers for causing the measurers to discharge in succession, the means associated with one receiver causing but one measurer to discharge.

30. In a packaging machine, a series of movable receivers, a stationary hopper beneath which the receivers pass in succession, a plurality of stationary charge measurers adapted to discharge into the stationary hopper, a trip device associated with each receiver adapted to cause one measurer to discharge into the hopper, and means for holding the trip device in inoperative position.

31. In a machine for making filled bags from bag tubes and filling material, a plurality of feed tubes each adapted to carry a longitudinally collapsed bag tube, two wheels, one above the other, adapted to rotate about the same vertical axis, and means for detachably securing the feed tubes at selected points to the circumferences of said wheels.

32. In a machine for making filled bags from bag tubes and filling material, a plurality of feed tubes each adapted to carry a longitudinally collapsed bag tube, two wheels, one above the other, adapted to rotate about the same vertical axis, means for detachably securing the feed tubes at selected points to the circumferences of said wheels, the means for attaching the tubes to the upper wheel including brackets whereby the upper end of each alternate tube is held at a distance from the circumference of the wheel.

33. In a machine for making filled bags from tubes and filling material, means for supporting a plurality of bag tubes in substantially vertical positions with their bottoms arranged in an endless series, said support being adjustable for moving the bottoms of adjacent tubes to or from each other, means for depositing charges of filling material in said tubes in succession, a sewing machine, and means for producing continuous relative movement between said sewing machine and the bag tubes, whereby the machine may sew across each tube in succession above the successively deposited charges.

34. In a machine for making filled bags from bag tubes and filling material, a plurality of feed tubes each adapted to carry a longitudinally collapsed bag tube, two wheels, one above the other, adapted to rotate about the same vertical axis, means for detachably securing the feed tubes at selected points to the circumferences of said wheels, the means for attaching the tubes to the upper wheel including brackets whereby the upper ends of part of tubes are held at a distance from the circumference of the wheel, means to rotate said wheels continuously, stationary charging mechanism adapted to deposit charges of filling material in the tubes as they successively come into registry therewith, and a stationary sewing machine below said feed tubes and adapted to sew across each bag tube in succession above the deposited charge.

35. In a bag filling machine, a support for the bottoms of the bags comprising an annular trough divided into compartments by transverse partitions.

36. In a bag filling machine, a support for the bottom of the bag comprising a box having a raised center with an opening therethrough, and a jigger adapted to operate through said opening.

37. In a bag filling machine, an annular bag carrying support, a plurality of bag holding pockets arranged thereon, means for filling the bags, means for tamping them, means for closing them, and means for rotating said annular bag support, the closing and filling means being operative at only one point in the path of each bag, the tamping means being operative throughout the larger portion of the support.

38. A bag supporting device comprising an annular trough, a plurality of radial walls dividing said trough into a plurality of pockets, the bottom wall of each of said pockets being upwardly inclined toward its center.

39. In a machine for making filled bags from bag tubes and filling material, a plurality of feed tubes each adapted to carry a longitudinally collapsed bag tube, a support, means for detachably fastening the feed tubes to the support in substantially vertical positions, means to continuously move the support to carry the tubes in an endless path, a hopper attached to the support above and in registry with each feed tube, a stationary hopper beneath which the support carried hoppers pass in succession, a sewing machine in the path of the bag tubes beneath the feed tubes, means to actuate the sewing machine continuously, and means for jigging the bag tubes when not in sewing position.

40. In a bag filling machine, a plurality of receiving hoppers arranged in a plurality of concentric substantially continuous rings, a plurality of feed tubes each adapted to have threaded thereon a bag tube and each having its upper end in register with a receiving hopper, and means for holding the tubes in position with their lower ends in a single circle.

41. In a bag filling machine, a plurality of receiving hoppers arranged in a plurality of concentric substantially continuous rings, a plurality of feed tubes and each adapted to have threaded thereon a bag tube and each having its upper end in register with a receiving hopper, means for holding the tubes in position with their lower ends in a single circle, a spreader on the lower end of each feed tube elongated circumferentially of said circle, and a sewing machine adapted to sew seams across the bag tubes beneath the feed tubes in succession.

42. In a machine for making filled bags from bag tubes and filling material, means to guide and support the upper end of a bag tube, means to support the lower end of a bag tube, means to deposit in the tube a charge of material, means for sewing a seam across the bag tube above the deposited charge, and means for adjustably positioning the bag holding and jigging means with relation to the sewing means to adapt the machine for different lengths of bags.

43. In a machine for making filled bags from bag tubes and filling material, means for rotatably supporting and guiding the upper ends of a series of lengths of bag tubing, means for supporting the bottoms of said lengths of tubing, means for filling charges into the said lengths, means for jigging the lower ends of the lengths, and means for sewing across the tubing above the charges, the means for supporting and jigging the lower ends of the bag lengths comprising a movable frame, means for adjusting said frame vertically, a jigging plate rotatably mounted on the frame, and a bag bottom support rotatably mounted on the frame above the jigging plate.

44. In a bag filling machine a large number of receiving hoppers having constricted discharge apertures, a guiding hopper adapted to come into register with them successively, a plurality of automatic scales all adapted to discharge their loads into the guiding hopper, selective means for automatically tripping said scales to cause an instantaneous discharge of a pre-weighed charge of material through the guiding hopper into successive receiving hoppers, means for operating said scales to weigh out another charge as soon as one has been discharged, and means for moving the receiving hoppers in a closed path beneath the guiding hopper at such rate that each receiving hopper will have discharged its contents between successive visits to the guiding hopper and at such rate that each scale will have time to weigh out a new charge before the next receiving hopper into which it is to discharge reaches the guiding hopper.

45. In a bag filling machine a large number of receiving hoppers having constricted discharge apertures, a guiding hopper adapted to come into register with them successively, a plurality of automatic scales all adapted to discharge their loads into the guiding hopper, selective means for automatically tripping said scales to cause an instantaneous discharge of a pre-weighed charge of material through the guiding hopper into successive receiving hoppers, means for operating said scales to weigh out another charge as soon as one has been discharged, means for moving the hoppers in a closed path beneath the guiding hopper at such rate that each receiving hopper will have discharged its load between successive visits to the guiding hopper and at such rate that each scale will have time to weigh out a new charge before the next receiving hopper into which it is to discharge reaches the guiding hopper, a plurality of feed tubes in register with the receiving hoppers, there being a bag forming tube threaded upon each of said feed tubes, means for drawing the bag tube off such feed tubes to form it into bags, and means for returning the receiving hoppers to the guiding hopper at such a rate that the charge will have had time to run out of the receiving hopper and its associated feed tube before its next visit to the guiding hopper.

In testimony whereof, I affix my signature this third day of December, 1919.

ADELMER M. BATES.